(No Model.) 2 Sheets—Sheet 1.

J. E. MOHNEY.
SULKY PLOW.

No. 315,813. Patented Apr. 14, 1885.

WITNESSES:
Otto Berger
C. Sedgwick

INVENTOR:
J. E. Mohney
BY Munn & Co.
ATTORNEYS.

N. PETERS, Photo-Lithographer, Washington, D. C.

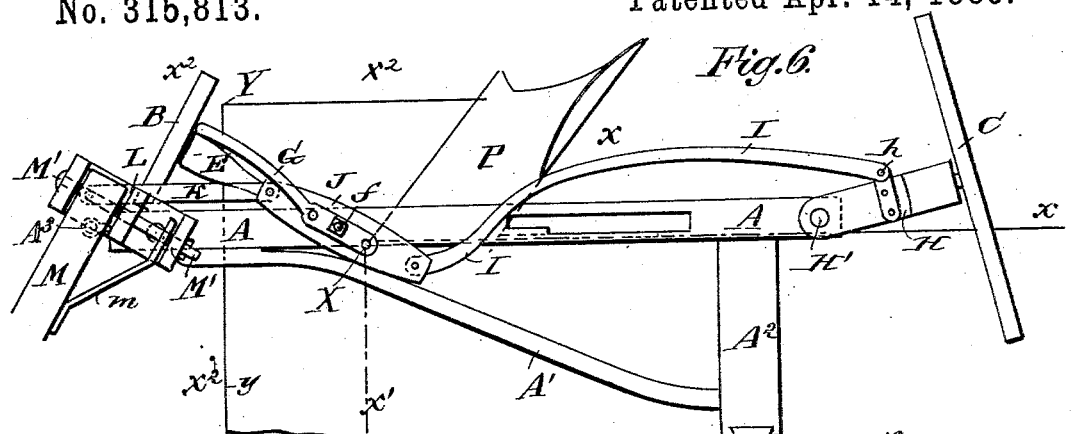
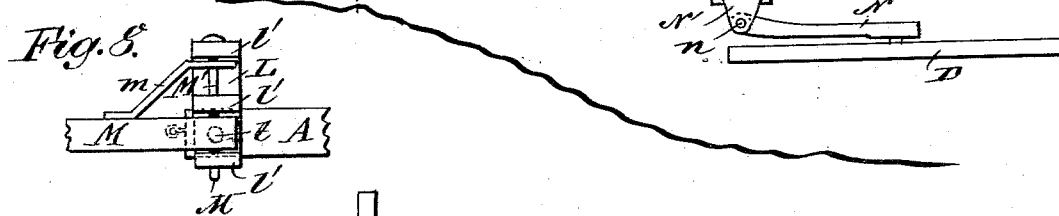
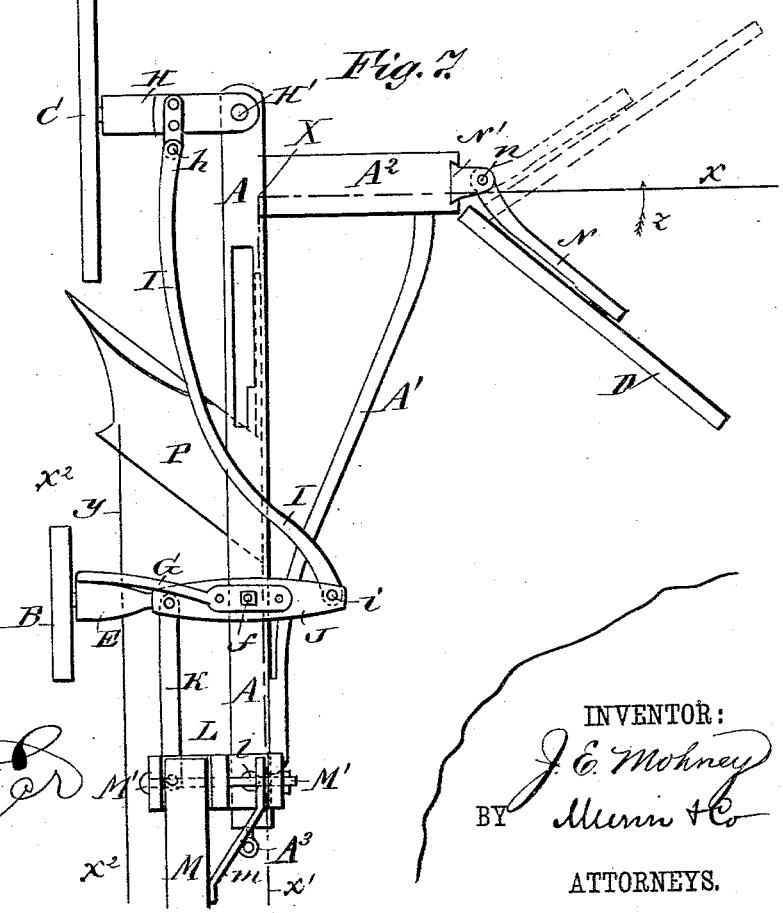

UNITED STATES PATENT OFFICE.

JAMES E. MOHNEY, OF EIGHT MILE, MISSOURI.

SULKY-PLOW.

SPECIFICATION forming part of Letters Patent No. 315,813, dated April 14, 1885.

Application filed December 8, 1884. (No model.)

*To all whom it may concern:*

Be it known that I, JAMES ELLET MOHNEY, of Eight Mile, in the county of Cass and State of Missouri, have invented a new and Improved Sulky-Plow, of which the following is a full, clear, and exact description.

My invention relates to sulky-plows, and has for its object to improve the construction and operation of this class of agricultural implements.

The invention includes a novel system of connections from the front furrow-wheel of the plow to the rear furrow-wheel, whereby the furrow-wheels will be moved toward and from each other by a swinging of one wheel, and in connections of the wheels to the tongue so that a side movement of the tongue by the team will control the positions of the furrow-wheels in guiding the plow in curves to either side or sharply around to leave a square corner of the unplowed land, together with a land-wheel journaled on a horizontally-swinging axle-arm pivoted to the plow-frame, the tongue of the plow being adapted for reversal to suit either two or three horses.

The invention includes, also, an improved arrangement of parts for connecting the plow proper to the plow-beam to allow it to be raised above the ground when out of use.

The invention consists, also, in particular constructions and combinations of parts of the plow, all as hereinafter fully described and claimed.

Reference is to be had to the accompanying drawings, forming part of this specification, in which similar letters of reference indicate corresponding parts in all the figures.

Figure 1:
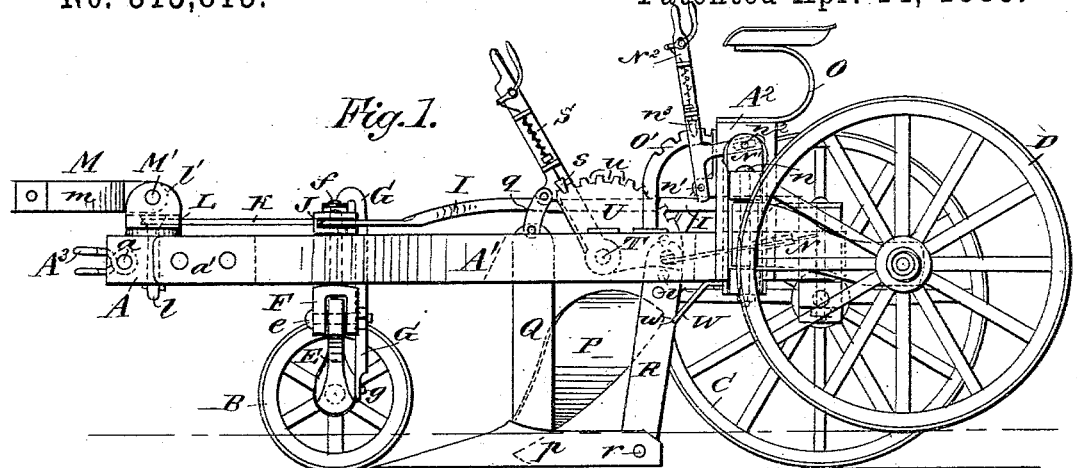
Figure 2:
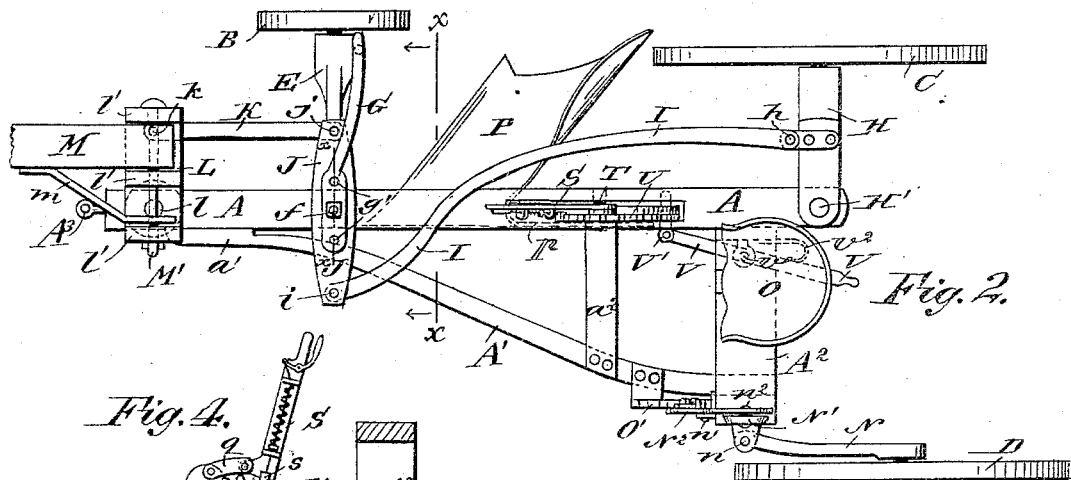
Figure 4:
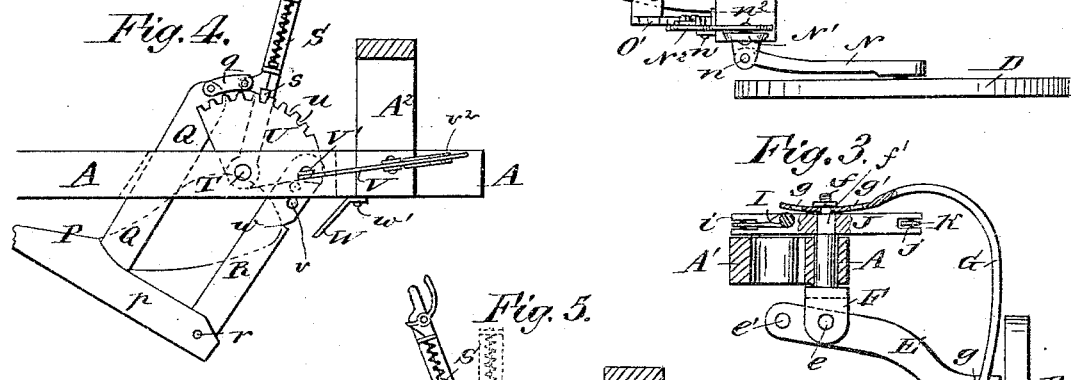
Figure 3:
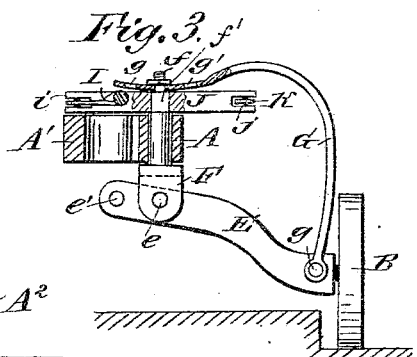
Figure 5:
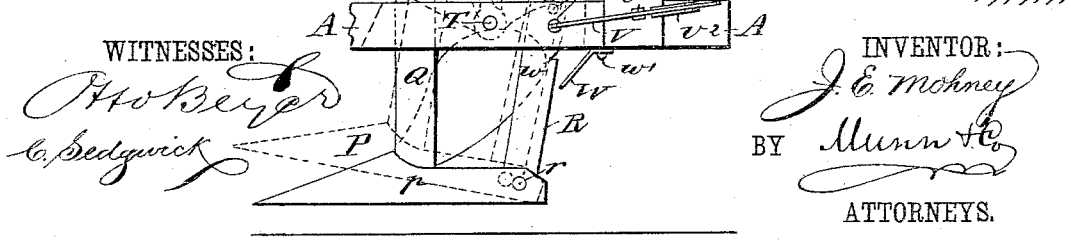

Figure 1 is a side elevation of my improved sulky-plow with the tongue broken away. Fig. 2 is a plan view thereof. Fig. 3 is a cross-sectional elevation taken on the line $x$ $x$, Fig. 2, looking forward. Figs. 4 and 5 are detail views illustrating the method of lifting the mold-board from the ground. Figs. 6 and 7 are diagram views illustrating the movements of the plow in turning a square corner at the end of a furrow, and Fig. 8 is a detail view showing the tongue of the plow in a reversed position.

The letter A indicates the beam of the plow, which is supported on the front furrow-wheel, B, the rear furrow-wheel, C, and the land-wheel D. The wheel B is journaled to a stud projecting from the outer end of an axle-arm, E, which is pivoted at $e$ between the side lugs of a head-block, F, which is in turn pivoted to the beam A on the stout pin $f$ fixed to the head-block, and so that the wheel B is free to swing with the arm E on the pivot-pin $f$ in horizontal plane, and may also be adjusted vertically by raising or lowering the arm E on the pivot $e$, and a brace rod or bar, G, is pivoted at $g$ to the outer end of the arm E, and curves upward and inward to connect with the reduced end of the pin $f$ by any one of a series of holes, $g'$, in its upper end, so that by adjusting the bar G to connect it by different holes $g'$ to the pin $f$ the furrow-wheel B may be raised or lowered as occasion may require, and additional holes, as at $e'$, are made in the arm E to receive the pivot-pin $e$, which allows the furrow-wheel B to be set closer to or farther from the side of the beam A and the landside of the plow, to guide or gage the plow to cause or allow it to cut furrows of different widths, the bar G being correspondingly adjusted to permit this lateral adjustment of the wheel B, and to gage the height of the wheel also, as will readily be understood. The rear furrow-wheel, C, is journaled to the end of an axle-arm, H, which is pivoted by a stout vertical pin, H', to the back end of the beam A, and to a suitable strap-iron or lug fixed to arm H is pivoted at $h$ the rear end of a connecting-bar, I, which crosses the beam A, and is connected pivotally at $i$ to one end of a bar or lever, J, which is fixed to the square portion $f'$ of the pin $f$, so as to turn with the pin and head-block F, and to the other end of said bar J is pivoted at $j$ the back end of a link or bar, K, which extends forward and is connected pivotally at $k$ to one end of a plate or block, L, which is pivoted at its other end by a strong pin, $l$, to the forward end of the beam A. With this construction, as the plate L is swung backward or forward on its pivot $l$ by the tongue M $m$, the furrow-wheels B C will be swung bodily toward and from each other, as hereinafter more fully explained. I make the block L with a central and opposite end lugs or flanges, $l'$, forming right and left hand spaces between the lugs, into either one of which the back end of the tongue-beam M loosely fits, while the side stay or plate, $m$, fixed to the beam M, stands at the face of the opposite end lug $l'$. When the tongue-beam M is held in the right-hand space of the block L by the pin M', as seen in Figs. 2, 6, and 7, three horses may be hitched by a suitable evener to the draft-clevis $A^3$, which is pivoted to the forward end of the beam A so that one horse walks in the furrow and two on the unplowed land, and when the tongue-beam M is in the left-hand space of the block L, as in Fig. 8, the plow-share will be thrown from the land, so it will not cut a full furrow, and may easily be drawn by two horses, one traveling on the land and the other in the furrow. I attach the clevis $A^3$ to the beam A on a horizontal pivot, $a$, so that the clevis is free to swing in vertical plane on the pivot, and as the entire draft is on the clevis side draft will always be avoided. The land-wheel D is journaled to the outer end of an axle-arm, N, which is pivoted on a vertical pin, $n$, to lugs of a block or plate, N', which is fitted to slide vertically in ways formed on or fixed to the rear arched bar, $A^2$, of the plow-frame, said bar $A^2$ being connected to the beam A, and to the side frame-bar, A', which extends forward and is connected at $a'$ to the main beam A, and a cross-bar, $a^2$, connecting the beam and bar A A' and bracing them to each other serves also as a foot-rest to the plowman seated on the spring-seat O. The axle-arm N is free to swing in horizontal plane as the plow is being turned squarely at the corners of the field, as hereinafter more fully explained, and by the aid of a three-armed lever, $N^2$, pivoted at $n'$ to the plow-frame and at $n^2$ to the block N', the block, and with it the axle-arm N and wheel D, may be adjusted in height to level the plow-frame transversely, and to raise the heel of the landside $p$ of the mold-board plow P slightly, so it will have little or no friction on the bottom of the furrow, thus greatly reducing the draft. The spring-pressed latch $n^3$ of the lever $N^2$ may enter any one of a series of holes or slots in the catch-plate O', fixed to the frame, for holding the wheel D at any required height. The plow P has a front standard, Q, which is fixed rigidly to the landside $p$, and a rear standard, R, which is pivoted at $r$ to the rear end of the landside. Both of the standards Q R extend up into and through a slot of the beam A, or it may be at one side of the beam, and the upper end of the standard Q connects by a loose or pivoted link, $q$, with a hand-lever, S, which is pivoted or hung on a stout pin, T, held to the beam A, and on the pin T also is hung loosely the segmental plate U, which is pivoted at $r'$ to the upper end of the plow-standard R, and has a series of holes or notches, $u$, into any one of which the spring-pressed latch $s$ of the lever S may be set. Below the pivot $r'$ the standard R has one or more holes, $v$, into any one of which holes may be passed through the beam A the latch-pin V' of a lever, V, which is pivoted at $v'$ to the machine-frame, and is acted on by a spring, $v^2$, of any approved kind, which holds its latch-pin V' into engagement with one of the holes $v$. The pivotal connection at $r'$ may be made by means of a tubular washer passing through the parts U R, and having a central hole forming one of the holes $v$ to receive the latch-pin V', as shown, and one or more of said latch-pin holes $v$ may be formed in the plate U.

I attach the plow P to the plow-frame in the manner above described to allow said plow P to be lifted clear of the ground when the machine is being moved over the road to and from the place of use, and in lifting the plow on the frame from the position of use indicated in Fig. 1 to the raised position indicated in Fig. 5 the latch $s$ of lever S will be lifted from its notch $u$ at or near the front of the plate U, and the lever will then be swung backward on the pin T, and the latch $s$ will again be engaged with the plate U, which has not shifted, which movement of the lever raises the point of the plow, as indicated in Fig. 4. The lever V will now be operated to withdraw the pin V' from the plate U, when the lever S, with its latch $s$ engaged with plate U as last described, will be swung forward on the pin T, and carries the plate U with it, which raises the standard R and the rear end of the plow P to the position shown in Fig. 5, when the latch-pin V' of lever V will enter a lower hole $v$ in the standard R and hold it securely, and should it be desired to lift the point of the plow still further, or to the position shown in dotted lines in Fig. 5, the lever-latch $s$ will be lifted from the plate U, and the lever S will be swung backward to set the latch in one of the back notches, $u$, of plate U.

The plow P is braced in working position by an angle iron or plate, W, which enters a notch, $w$, in the back edge of the rear standard, R, said brace W being held pivotally at $w'$ to the beam A, so it may be swung around to allow the plow to be lifted from the ground, as last above described.

The operation of the plow is as follows: The plow P is let down to working position in the field, and in cutting the first furrow or a back furrow the wheel B will be raised to allow the plow P to enter the ground to a sufficient depth by adjusting the brace-rod G, as hereinbefore described, and for the succeeding cuts the wheel B will be lowered to the bottom of the preceding furrow, the wheel C following it in the furrow and the wheel D rolling on the unplowed land, and by turning the team more or less to either side the tongue will be correspondingly turned, which will swing the connected wheels B C to draw the plow P through the soil in curves of longer or shorter radius, as may be required in plowing stumpy or rocky lands; but the principal advantage secured by my system of plow-wheels is that it enables the plow to turn a perfectly square corner at the end of each furrow, as illustrated in Figs. 6 and 7.

In Fig. 6 the plow P is shown as it had been drawn to the end of a straight furrow, $x$, up to a point at X, about the width of a furrow from the next angular side or edge y of the unplowed land, and after the plow had reached the point X the team is to be pulled sharply to the left to turn the tongue M m that way, which will swing the furrow-wheels B C to the positions shown in said Fig. 6, the wheel B just clearing the corner Y of the unplowed land, and as the team turns into and along the other side or angle of the land to cut a furrow on the land-line $x'$ the plow P will swing around sharply on the point of land at X, or thereabout, until the landside $p$ comes into line with the line $x'$ of the furrow to be cut, and as the plow P is turning at the angle the wheel C will run off or outward on the plowed land, and the wheel D will swing around bodily from its normal trailing position when the plow is cutting a straight furrow, as shown in Fig. 6, to the position shown in Fig. 7 in full lines, or nearly in the same plane with the wheel C, so that there is no side draft or drag of the wheels on the land, which enables the plow P to turn easily and sharply around a square corner at X, and when the plow advances for a little in cutting the furrow on the line $x'$ the land-wheel D gradually will swing around in the direction of the arrow $z$ in Fig. 7, and as illustrated in dotted lines, until the said wheel D swings back of the frame and about parallel with the furrow-wheel C, which is the relative positions of these wheels, until the next corner of the unplowed portion of the field is reached, when the plow may again be sharply turned at a right angle, and so on until all the land is plowed.

It will be noticed that as the plow is turning at the corner of the land the forward furrow-wheel, B, never leaves the preceding furrow, $x^2$, and the wheel D does not leave the unplowed land, so that the land is plowed at the turned corners at the same depth as along the straight furrows. As shown in the drawings, I position the axle-arm E of the front furrow-wheel, B, low down near the ground and about in line with the extreme end or point of the plow P when the plow is running straight ahead, and so that the axle-arm E acts as a weed-hook to turn down the weedy growths directly in front of the turning furrow-slice and close to the ground, so that the turned furrow-slice will cover the weeds completely and the ground be left clean, and the weeds will be smothered and used as a fertilizer.

In housing the plow, the tongue will be folded back on it by swinging the tongue over on its draft-bolt M', as will readily be understood.

Having thus described my invention, what I claim as new, and desire to secure by Letters Patent, is—

1. A sulky-plow the frame of which is supported on two furrow-wheels journaled on the outer end of horizontally-movable axle-arms pivoted at or near their inner ends to the frame, said axle-arms being connected to swing the furrow-wheels bodily toward and from each other by the swinging of one of the wheels, and a land-wheel journaled on a horizontally-movable axle-arm pivoted at its forward end to the rear end of the plow-frame opposite the rear furrow-wheel, substantially as herein set forth.

2. A sulky-plow the frame of which is supported on two furrow-wheels journaled on the outer ends of horizontally-movable axle-arms pivoted at or near their inner ends to the frame, said axle-arms being connected to swing the furrow-wheels bodily toward and from each other by the swinging of one of the wheels, and a land-wheel journaled on a horizontally-movable axle-arm pivoted at its forward end to the rear end of the plow-frame opposite the rear furrow-wheel, and said land-wheel axle-arm being vertically adjustable on the plow-frame, substantially as herein set forth.

3. A sulky-plow the frame of which is supported on two furrow-wheels journaled on the outer ends of horizontally-movable axle-arms pivoted at or near their inner ends to the frame, and connected to each other and to the tongue of the plow so as to be swung toward and from each other by the swing of the tongue, and a land-wheel journaled to a horizontally-swinging axle-arm pivoted at its forward end to the rear end of the plow-frame opposite the rear furrow-wheel, substantially as herein set forth.

4. A sulky-plow the frame of which is supported on two furrow-wheels journaled on the outer ends of horizontally-movable axle-arms pivoted at their inner ends to the front and rear ends of the frame, said axle-arms being connected to swing the furrow-wheels bodily toward and from each other by the swinging of one of the wheels, the front furrow-wheel being vertically adjustable, and a land-wheel journaled on a horizontally-movable axle-arm pivoted at its forward end to the rear end of the plow-frame opposite the rear furrow-wheel, substantially as herein set forth.

5. A sulky-plow the frame of which is supported on two furrow-wheels journaled on the outer ends of horizontally-movable axle-arms pivoted at their inner ends to the front and rear ends of the frame, said axle-arms being connected to swing the furrow-wheels bodily toward and from each other by the swinging of one of the wheels, the front furrow-wheel being vertically and laterally adjustable, and a land-wheel journaled on a horizontally-movable axle-arm pivoted at its forward end to the rear end of the plow-frame opposite the rear furrow-wheel, substantially as herein set forth.

6. A sulky-plow the frame of which is supported on two furrow-wheels journaled on horizontally-movable axle-arms pivoted at their inner ends to the front and rear ends of the frame, said axle-arms being connected to swing the furrow-wheels bodily toward and from each other by the swinging of one of the wheels, the front furrow-wheel being vertically and laterally adjustable, and a land-wheel journaled on a horizontally-movable axle-arm pivoted at its forward end to the rear end of the plow-frame so as to be vertically adjustable, substantially as herein set forth.

7. In a sulky-plow, the combination of the plow-frame, a land-wheel, the furrow-wheel B, journaled to an axle-arm, E, pivoted to a head-block, F, which is pivoted on a pin, $f$, to the beam A, the rear furrow-wheel, C, journaled to an axle-arm, H, pivoted at H′ to the beam A, and the bar J, rigid on pivot-pin $f$, and connected pivotally to a bar, I, which is connected to the axle-arm H, substantially as herein set forth.

8. In a sulky-plow, the combination of the plow-frame, a land-wheel, the front furrow-wheel, B, journaled to an axle-arm, E, pivoted adjustably at $e$ to a head-block, F, which is pivoted on a pin, $f$, to the beam A, the rear furrow-wheel, C, journaled to an axle-arm, H, pivoted at H′ to the beam A, the bar J, rigid on pivot-pin $f$, and connected pivotally to a bar, I, which connects with the arm H, and a brace-bar, G, connecting the axle-arm E to the plow-beam, and having a series of holes, $g'$, adapted to engage the pin $f$, substantially as herein set forth.

9. In a sulky-plow, the combination of the plow-frame, a land-wheel, the furrow-wheel B, journaled to an axle-arm, E, pivoted to a head-block, F, which is pivoted on a pin, $f$, to the beam A, the rear furrow-wheel, C, journaled to an axle-arm, H, pivoted at H′ to the beam A, the bar J, rigid on pivot-pin $f$, and connected pivotally to a bar, I, which is connected to the axle-arm H, and a link, K, connecting the arm J to the rear end of the tongue, substantially as herein set forth.

10. The combination, in a sulky-plow, of the plow-frame, a land-wheel, the furrow-wheel B, journaled to an axle-arm, E, pivoted to a head-block, F, which is pivoted on a pin, $f$, to the beam A, the rear furrow-wheel, C, journaled to an axle-arm, H, pivoted at H′ to the beam A, the bar J, rigid on pivot-pin $f$, and connected pivotally to a bar, I, which is connected to the rear axle-arm, H, a link, K, connecting the bar J to a plate or block, L, which is pivoted at $l$ to the beam A, and has lugs, $l'$, and a tongue, M $m$, fitted to the plate L, and adapted for reversal in the plate, substantially as herein set forth.

11. The combination, in a sulky-plow, of the plow-frame, the furrow-wheel B, journaled to an axle-arm, E, pivoted to a head-block, F, which is pivoted on a pin, $f$, to the beam A, the rear furrow-wheel, C, journaled to an axle-arm, H, pivoted at H′ to the beam A, the bar J, rigid on pivot-pin $f$, and connected pivotally to a bar, I, which connects to the rear axle-arm, H, and a land-wheel, D, journaled to an axle-arm, N, pivoted to a block, N′, which is vertically adjustable on the plow-frame, and means for holding and shifting the block N′, substantially as herein set forth.

12. The combination, with the plow-frame and the land-wheel D, journaled to an axle-arm, N, pivoted to the block N′, fitted to slide vertically on the plow-frame, of the lever N² $n^2$, and catch-plate O′, substantially as herein set forth.

13. The combination, with the plow-beam and the furrow-wheel B, journaled to an axle-arm, E, pivoted at $e$ to the swinging head-block F, of the brace-rod G, connected pivotally at $g$ to the arm E, and having a series of holes, $g'$, adapted to the head of the pivot $f$ of the head-block F, substantially as herein set forth.

14. The combination, with the plow-beam A and plow P, of the standard Q, rigidly connected to the plow, the standard R, pivoted at $r$ to the plow, the catch-plate U and lever S, hung independently on the pin T, the link $q$, and means for holding the lever S to the catch-plate U, and for holding the standard R to the plow-beam, substantially as herein set forth.

15. The combination, with the plow-beam A and plow P, of the standards Q R, the catch-plate U and lever S, hung independently on the pin T, and the link $q$ of the latch $s$ on lever S, entering notches or holes of the plate U, substantially as herein set forth.

16. The combination, with the plow-beam A, plow P, having standards Q R, lever S, link $q$, and catch-plate U, of the lever V and pin V′, substantially as herein set forth.

17. The combination, with the plow-beam A and plow P, of the forward standard, Q, vertically adjustable on the said beam, the vertically-adjustable rear standard, R, having apertures for the latch to engage, and a notch, $w$, on its rear edge, and the brace W, secured to the under side of the plow-beam, and constructed to engage the notch with its lower end, substantially as set forth.

JAMES E. MOHNEY.

Witnesses:
JIM HORNEY,
DAVID L. SKILLMAN.